United States Patent
Li et al.

(10) Patent No.: US 8,867,512 B2
(45) Date of Patent: Oct. 21, 2014

(54) AUTONOMOUS DISCOVERY FOR ENHANCED WIFI DEVICES

(75) Inventors: Junyi Li, Chester, NJ (US); Hemanth Sampath, San Diego, CA (US); Saurabha Rangrao Tavildar, Jersey City, NJ (US)

(73) Assignee: QUALCOMM Incorporated, San Diego, CA (US)

(*) Notice: Subject to any disclaimer, the term of this patent is extended or adjusted under 35 U.S.C. 154(b) by 172 days.

(21) Appl. No.: 13/562,167

(22) Filed: Jul. 30, 2012

(65) Prior Publication Data

US 2014/0029596 A1  Jan. 30, 2014

(51) Int. Cl.
*H04W 4/00* (2009.01)
*H04W 8/00* (2009.01)
*H04W 48/16* (2009.01)

(52) U.S. Cl.
CPC ............ *H04W 48/16* (2013.01); *H04W 8/005* (2013.01); *Y02B 60/50* (2013.01)
USPC .......................................... 370/338; 370/328

(58) Field of Classification Search
USPC ................... 370/338, 328, 229; 709/227, 228
See application file for complete search history.

(56) References Cited

U.S. PATENT DOCUMENTS

| | | | |
|---|---|---|---|
| 7,523,197 B2 | 4/2009 | Castaneda et al. | |
| 7,962,629 B2 | 6/2011 | Bigioi et al. | |
| 2005/0249167 A1* | 11/2005 | Salokannel | 370/336 |
| 2007/0286136 A1* | 12/2007 | Rittle et al. | 370/338 |
| 2009/0013081 A1* | 1/2009 | Laroia et al. | 709/228 |
| 2009/0287827 A1* | 11/2009 | Horn et al. | 709/227 |
| 2011/0064012 A1* | 3/2011 | Abhishek et al. | 370/311 |
| 2011/0141965 A1 | 6/2011 | Kasslin et al. | |
| 2011/0205887 A1* | 8/2011 | Wu et al. | 370/229 |
| 2011/0299422 A1 | 12/2011 | Kim et al. | |

FOREIGN PATENT DOCUMENTS

EP  2367370 A1  9/2011

OTHER PUBLICATIONS

International Search Report and Written Opinion—PCT/US2013/052125—ISA/EPO—Nov. 4, 2013.

\* cited by examiner

*Primary Examiner* — Andrew Lai
*Assistant Examiner* — Sumitra Ganguly
(74) *Attorney, Agent, or Firm* — Joseph B. Agusta

(57) ABSTRACT

Techniques for discovering one or more nodes in a communication system are provided. A node may receive one or more discovery messages during a first occurrence of a periodic discovery interval. The node may determine a duration of a subsequent occurrence of the periodic discovery interval based on the one or more received discovery messages. The node may adjust the duration for the subsequent occurrence of the periodic discovery interval based on the determined duration.

36 Claims, 15 Drawing Sheets

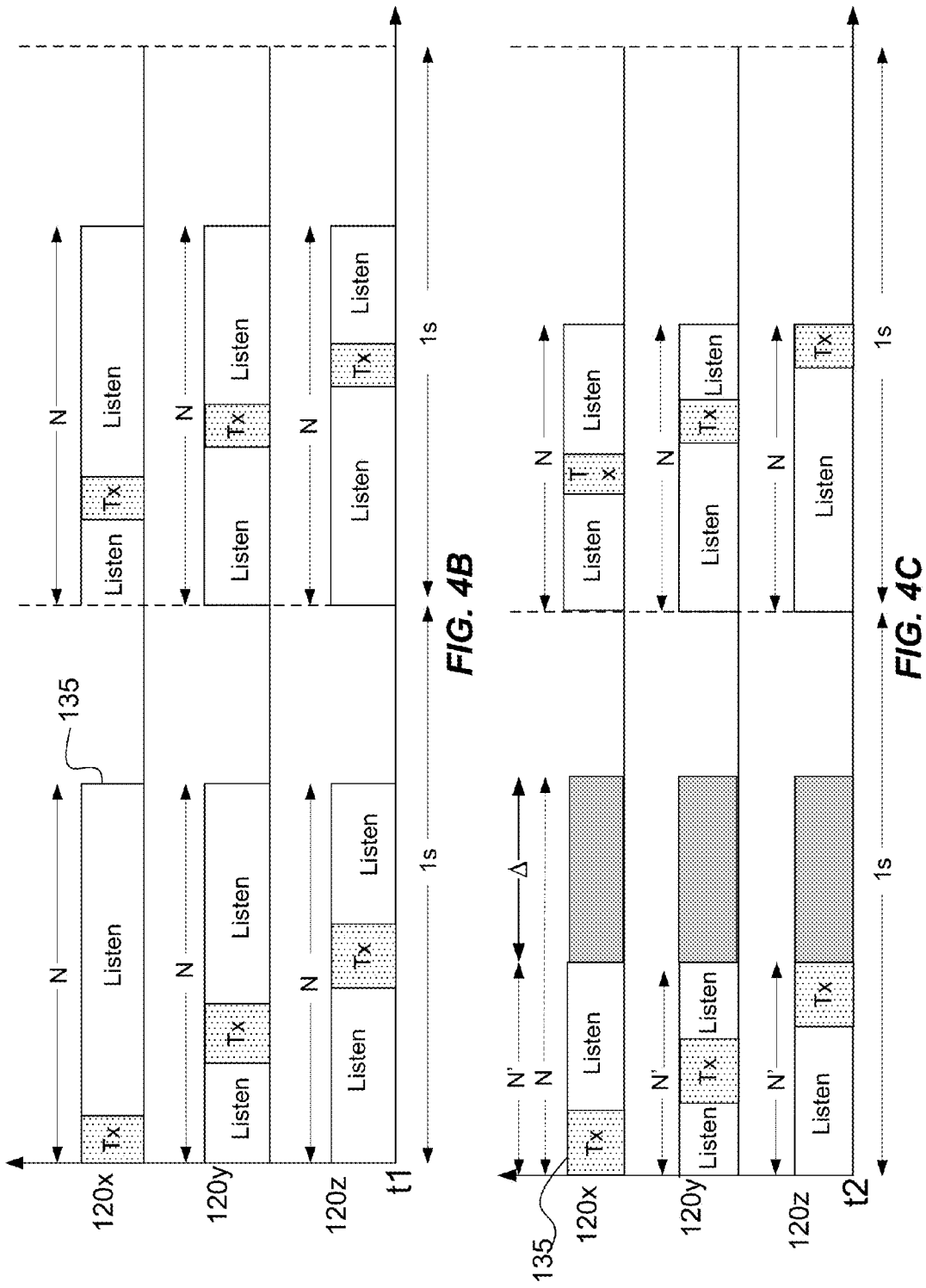

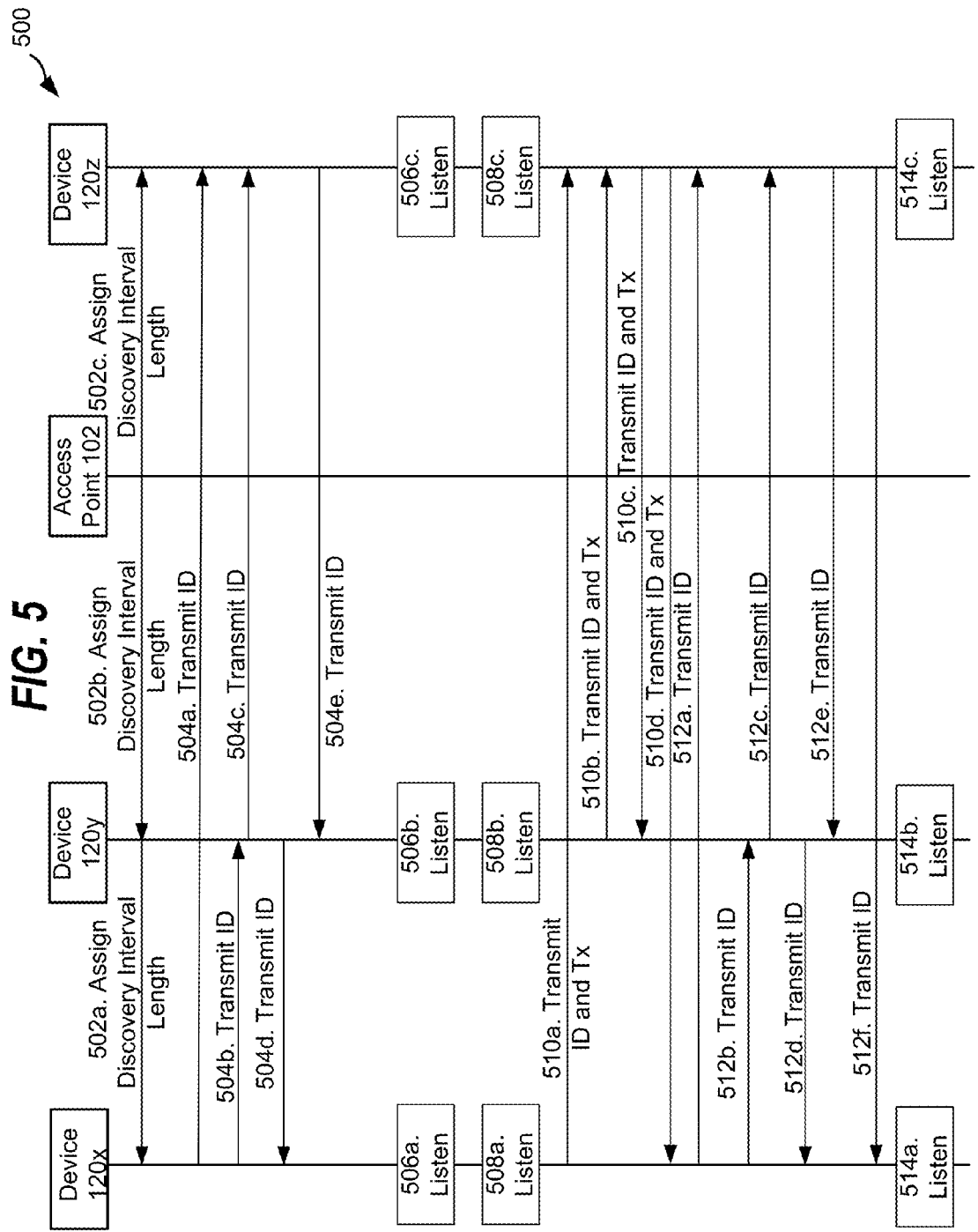

AUTONOMOUS DISCOVERY FOR ENHANCED WIFI DEVICES

BACKGROUND

I. Field

The present disclosure relates generally to communication, and more specifically to techniques for supporting autonomous discovery for enhanced WiFi devices.

II. Background

Wireless communication networks are widely deployed to provide various communication content, such as voice, video, packet data, messaging, broadcast, and the like. These wireless networks may be multiple-access networks capable of supporting multiple users by sharing the available network resources. Examples of such multiple-access networks include: Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. A wireless communication network may also be referred to as a wide area network (WAN). For example, a 3GPP Long Term Evolution (LTE), is a WAN standard that provides high speed data access, with latency on the order of 30 ms.

In contrast to a WAN, a local area network (LAN) may be provided wirelessly (WLAN). A WLAN may offer high data speeds, and decreased latency (on the order of 10 ms). A WLAN may be used to interconnect proximate devices by employing widely used networking protocols, such as Wireless Fidelity (WiFi), or, more generally, a protocol selected from the IEEE 802.11 wireless protocol family. Proximate WiFi devices may discovery one another during a predefined time allotted for the respective discovery, by each device, of other nearby devices, herein referred to as the periodic discovery interval, or the discovery window. However, because the duration of a given periodic discovery interval is not optimized in known WiFi discovery protocols, disadvantages may arise due to inefficiencies inherent in having a predefined length for the periodic discovery interval.

It may be desirable to overcome these disadvantages, such as by increasing the power consumption efficiency of devices engaged in discovery, by adaptively optimizing the periodic discovery interval to increase efficiencies for WiFi devices engaged in autonomous discovery.

SUMMARY

The present disclosure provides techniques for performing relay assisted peer discovery.

In an embodiment, apparatus, computer programs, methods and systems for discovering one or more nodes in a communication system are provided. In such an embodiment, a node may receive one or more discovery messages during a first occurrence of a periodic discovery interval. The node may determine a duration of a subsequent occurrence of the periodic discovery interval based on the one or more received discovery messages. The node may adjust the duration for the subsequent occurrence of the periodic discovery interval based on the determined duration.

Various and additional aspects and features of the disclosure are described in further detail below.

BRIEF DESCRIPTION OF THE DRAWINGS

FIGS. 4A, 4B, and 4C are timing diagrams showing respective periodic discovery intervals of enhanced WiFi devices according to embodiments of the present disclosure.

FIG. 5 is a signaling diagram illustrating signaling as between an access point and enhanced WiFi devices of a WLAN according to embodiments of the present disclosure.

DETAILED DESCRIPTION

Figure 1:
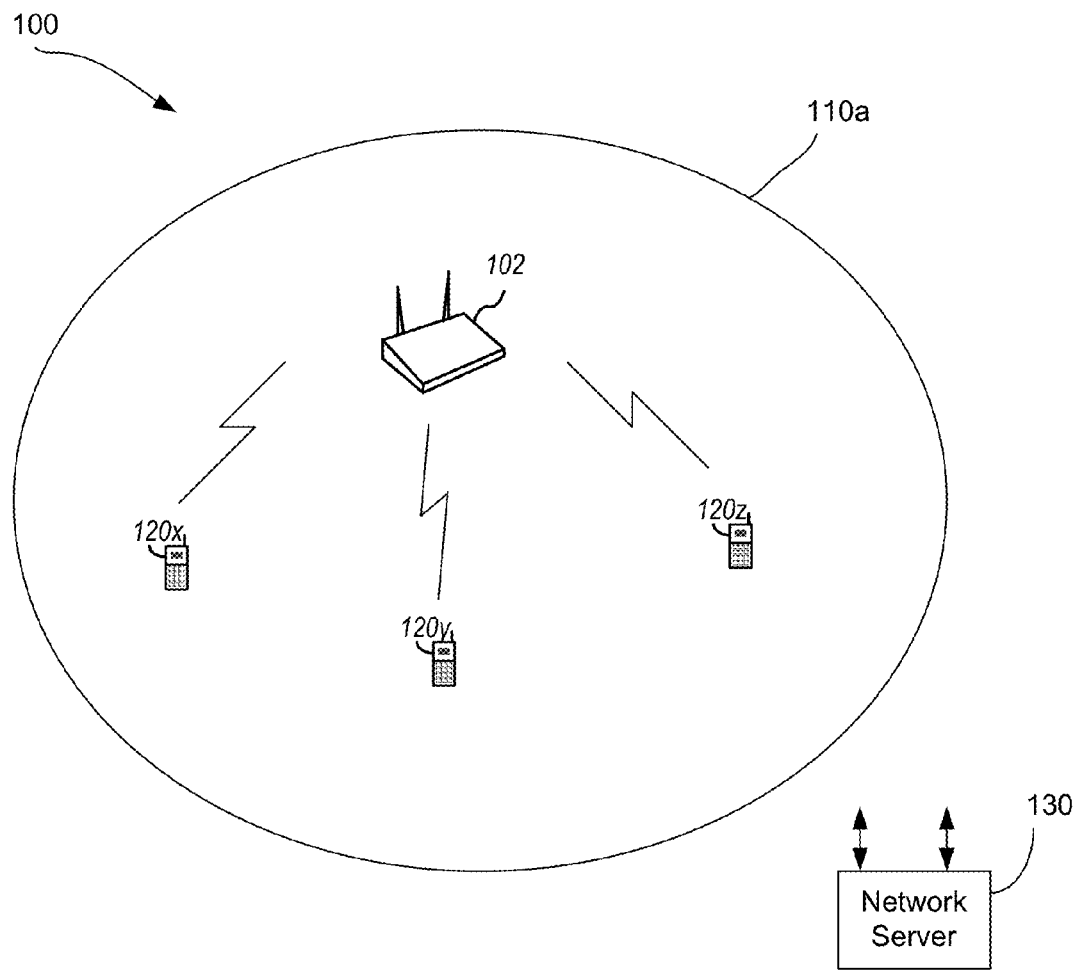
FIG. 1 shows a wireless communication network, which may be a WLAN network or other wireless network, according to embodiments of the present disclosure.

The figures and descriptions of the disclosure have been simplified to illustrate elements that are relevant for clear understanding, while eliminating, for the purposes of clarity and brevity, other elements found in typical telecommunications apparatuses, systems, and methods. Those of ordinary skill in the art will thus recognize the other elements and/or steps that are desirable and/or required in implementing the disclosure. However, because such elements and steps are well known in the art, and because they do not facilitate a better understanding of the present invention, a discussion of such elements and steps is not provided herein. The disclosure herein is nevertheless directed to all variations and modifications to the disclosed elements and steps that will be known or apparent to those skilled in the art in light of this disclosure.

The techniques described herein may be used for various wireless communication networks, such as CDMA, TDMA, FDMA, OFDMA, SC-FDMA, and other wireless networks. The terms "network" and "system" are often used interchangeably herein. By way of example, a CDMA network may implement a radio technology such as Universal Terrestrial Radio Access (UTRA), cdma2000, and the like. For example, an OFDMA network may implement a radio technology such as Evolved UTRA (E-UTRA), Ultra Mobile Broadband (UMB), IEEE 802.11 (WiFi), IEEE 802.16 (WiMAX), IEEE 802.20, Flash-OFDM®, and the like. UTRA and E-UTRA are part of Universal Mobile Telecommunication System (UMTS). UTRA, E-UTRA, UMTS, as well as long term evolution (LTE) and other cellular techniques, are described in documents from an organization named "3rd Generation Partnership Project" (3GPP) and "3rd Generation Partnership Project 2" (3GPP2).

WiFi is typically deployed as a wireless local area network (WLAN) that may extend home and business networks. As referenced, the IEEE 802.11 standard defines WiFi communications as between devices, and as between devices and access points. WiFi typically provides aggregate user data speeds from 2 Mbps (for 802.11b) to approximately 150 Mbps (for 802.11n). Typical speeds for WiFi are around 15 Mbps, and typical latency (i.e., packet delay) averages around 10 ms with no load. WiFi may link devices, and/or devices and access points, over distances from a few feet to several miles. By way of contrast, LTE and WiMax, as discussed above, typically provide WAN connectivity that may stretch for much greater distances, but which, due in part to increased latency, are typically not preferred for LAN communications. Of note, the techniques described herein may be used for the wireless networks and radio technologies mentioned above, as well as for other wireless networks and radio technologies.

WiFi networks, herein also referred to as IEEE 802.11 wireless networks, may operate in two modes: infrastructure mode and ad-hoc mode. In infrastructure mode, a device connects to an access point (AP) that serves as a hub for connecting wireless devices to the network infrastructure, including, for example, connecting wireless devices to Internet access. Infrastructure mode thus uses a client-server architecture to provide connectivity to the other wireless devices. In contrast to the client-server architecture of infrastructure mode, in ad-hoc mode wireless, devices have direct connections to each other in a peer-to-peer architecture.

Referring now to FIG. 1, wireless network technologies may include both the afore-discussed WANs, and various types of WLANs. WLAN 100 may be used to interconnect nearby devices by employing widely used networking protocols, such as using the IEEE 802.11 wireless protocol family.

In one aspect, WLAN 100 operating in infrastructure mode may comprise various devices 120x, 120y, 120z, and an access point 102 which may serve a coverage area forming WiFi cell 110a. An access point, as used herein, may be a station that supports communication for wireless devices associated with that access point. An access point may also be referred to as a WiFi base station. In general, a WLAN may include any number of access points. Each access point may be identified by an access point identity (APID), which may be a globally unique Medium Access Control (MAC) address (i.e., an address that provides a unique identifier in the MAC protocol layer) that is included in frames transmitted by the access point 102. Access point 102 may directly or indirectly couple to a network server 130 that may perform various functions. The network server 130 may be a single network entity or a collection of network entities.

A wireless device, or "device," refers herein to a station that can communicate with another station via a wireless medium. A device may be stationary or mobile, and may also be referred to as a mobile station, a user equipment, a subscriber station, etc. A device may be a cellular phone, a personal digital assistant (PDA), a handheld device, a wireless device, a laptop computer, a wireless modem, a cordless phone, a telemetry device, a tracking device, and the like. A device, and/or an access point, may also receive signals for satellites, which may be part of the United States Global Positioning System (GPS), the European Galileo system, the Russian Glonass system, or some other satellite Positioning System (SPS). A device may measure signals for access point 102, for other devices, and/or signals from the aforementioned satellites. The measurements may be used to determine the location and/or the connectivity of the device, the other devices, and/or the access points.

In the description herein, WLAN communication refers to communication between a device and an access point. More specifically, communication in the aforementioned infrastructure mode, such as for communication between the device and a remote entity, such as another device, via the access point. A WLAN link, and variants thereof, as used herein, thus refers to a communication link between a device and an access point.

In contrast, in ad hoc mode, also referred to herein as peer-to-peer (P2P) mode, one of the devices may provide some or all of the communication and communication management responsibilities of the access point 102 and/or of the network server 130. These responsibilities may include the periodic beaconing process, and the authentication of new members, by way of non-limiting example. Accordingly, P2P mode may be used to connect mobile devices together when there is no operating or present access point.

Thus, P2P mode, or P2P communication, as used herein, refers to direct communication between two or more devices, wherein the direct communication occurs without going through and/or without need of an access point. A P2P link, or variants thereof, thus refers to a direct communication link between two or more devices engaged in P2P communication. Correspondingly, a WLAN device is a device that is interested or engaged in WLAN communication, and a P2P device (otherwise known as an enhanced device) is a device that is interested or engaged in P2P communication. A device, as used herein, may be a WLAN device, or an "enhanced" WiFi device. As used herein, an enhanced WiFi device may be one that provides enhanced capabilities, such as for improved communications, increased power consumption efficiencies, increased other efficiencies, or the like.

A P2P group refers to a group of two or more devices engaged in P2P communication. In one embodiment, one device in the P2P group may be designated as a P2P server (or a P2P group owner), and each remaining device in the P2P group may be designated as a P2P client. The P2P server may perform certain management functions, such as exchanging signaling with an access point of the WLAN, coordinating data transmission between the P2P server and the P2P client (s), and the like.

More particularly, IEEE 802.11 defines a set of standards to carry out the WLAN communication that may occur in FIG. 1 as between devices 120x, 120y, 120z, and as between devices 120x, 120y, 120z and access point 102, at the physical (PHY) and MAC protocol layers. The WiFi Alliance is a trade group that certifies wireless devices based on adherence to the IEEE 802.11 standards, and that endeavors to guarantee interoperability between different wireless devices. More particularly, at the PHY layer, IEEE 802.11 defines and the WiFi Alliance endeavors to enforce two sublayers, namely the Physical Layer Convergence Procedure (PLCP), and the Physical Medium Dependent sublayer (PMD).

The PLCP sublayer defines specifications for converting MAC Layer Protocol Data Units (MPDUs) into a suitable frame format. This enables sending and receiving of user data and management information between two or more devices using the underlying PMD sublayer. The PMD sublayer defines specifications for methods of transmitting and receiving user data over a wireless medium between two or more devices and characteristics of the user data.

Figure 2:
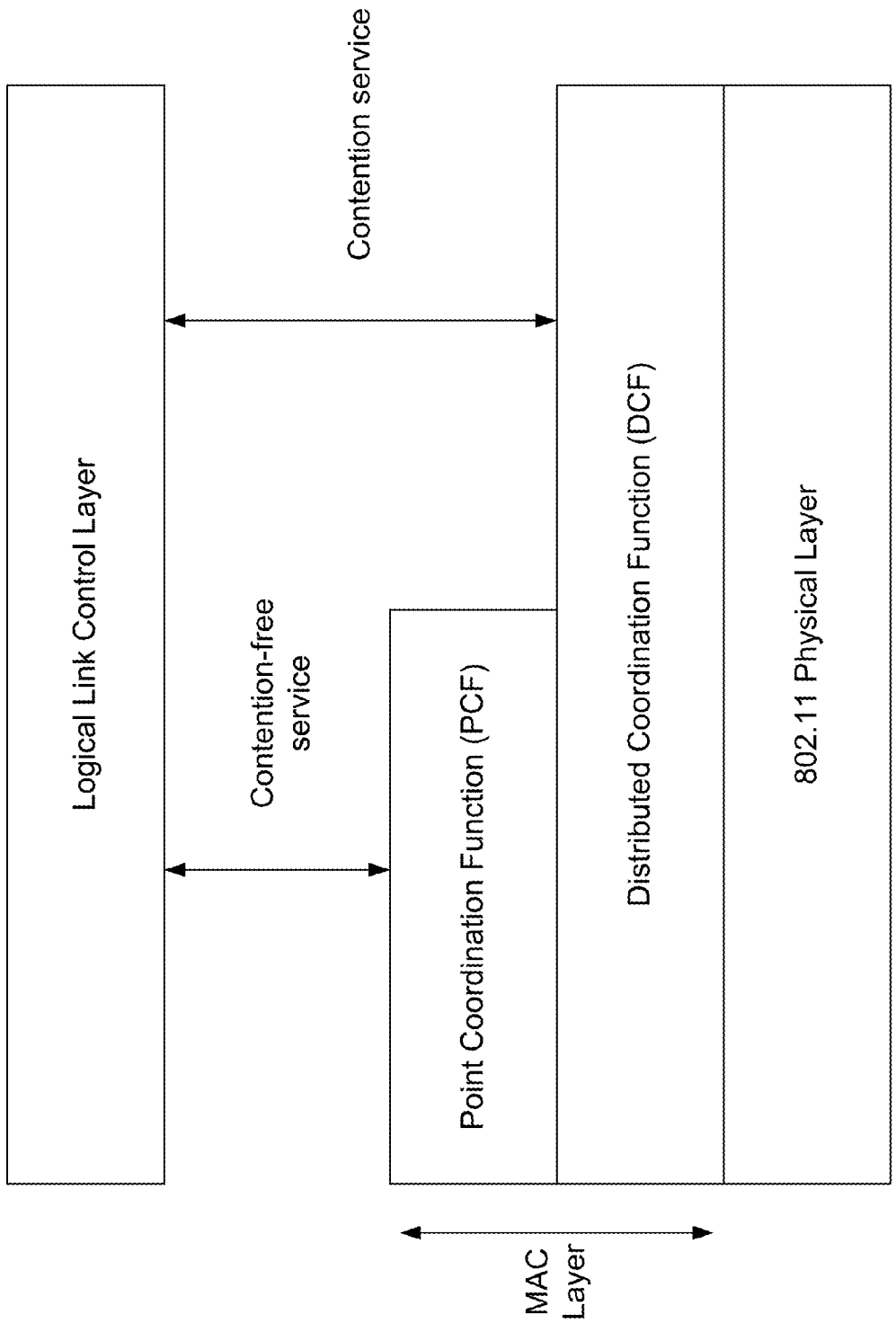
FIG. 2 shows an IEEE 802.11 protocol architecture above the physical layer according to embodiments of the present disclosure.

FIG. 2 shows the IEEE 802.11 protocol architecture above the PHY layer. More particularly, FIG. 2 depicts the logical link control layer, the MAC layer, the distributed coordination function (DCF) sublayer, and the point coordination function (PCF) sublayer that manages centralized access control. Specifically for the MAC layer in the illustration of FIG. 2, IEEE 802.11 specifies numerous functionalities, two of which are reliable data delivery and medium access control.

Reliable Data Delivery

IEEE 802.11 provides two mechanisms to ensure reliable frame delivery. In frame exchange protocol, for every frame received, an acknowledgement (ACK) frame is returned to the source. The source may be, for example, device 120x or access point 102. If the receiver does not receive the frame, or if the ACK frame sent by the receiver is lost, the source sends the subject frame again.

For enhanced reliability, a four-frame exchange mechanism is used. In this mechanism, the source issues a request to send (RTS) frame to the destined receiver. This frame alerts nearby devices to refrain from transmission so that collisions can be avoided. The receiver sends back a clear to send (CTS) frame to source. On the receiving CTS frame, the source transmits data and the receiver replies with an ACK frame. Although this mechanism ensures enhanced reliability, it may retard the ability of other stations from transmitting data. Hence, this mechanism is typically disabled by default.

Medium Access Control

There are currently several approaches to medium access control regarding IEEE 802.11, including distributed access control, such as for P2P communication, and centralized access control, such as for WLAN communication. In distributed access control, a decision to transmit is made using a carrier-sense mechanism of Carrier Sense Multiple Access/Collision Avoidance (CSMA/CA). On the other hand, in centralized access control, the access point 102 may control the access mechanism. In order to satisfy both these approaches, a distributed foundation wireless MAC (DFWMAC) algorithm may be employed that provides distributed access control mechanisms as well as optional centralized control on upper protocol layers.

The DCF sublayer, for example, and as illustrated in FIG. 2 uses the CSMA/CA mechanism for transmitting MAC frames. The mechanism may indicate performance of the steps of:

1. If communication medium is idle, device 120x waits for an Interframe Space (IFS) time period and, if the idle state remains during this period, the device 120x transmits immediately.
2. If the communication medium goes busy, the device 120x may postpone transmission and continuously monitor for another idle state.
3. When the current busy state is over, the device 120x may wait for another IFS time period. If an idle state remains during this next IFS period, the device 120x backs off by a random amount of time (for a countdown period tC) and senses again. If the idle state still remains, the station transmits. The backoff timer is stopped if a busy state occurs during the backoff period, and resumes when the idle state resumes.
4. If, after transmission, an ACK is not received by device 120x, it is assumed that a collision has occurred.

In the PCF sublayer, all devices are polled in round-robin fashion. If a device has a frame to send, it transmits it when polled. Because the IFS time period for the polling is less than the IFS time period for the DCF sublayer, the polling gets higher priority to access communications.

IEEE 802.11 specifies three physical mediums in the MAC layer for the aforementioned communications. Direct Sequence Spread Spectrum (DSSS) operates in the 2.4 GHz ISM band with data rates of 1 and 2 Mbps. Up to three non-overlapping channels each with a bandwidth of 5 MHz are used. A differential binary phase shift keying encoding scheme may be used. Frequency Hopping Spread Spectrum (FHSS) operates in the 2.4 GHz ISM band with data rates of 1 and 2 Mbps. The FHSS system hops between multiple channels based on a pseudonoise sequence. Infrared is an omnidirectional scheme with a range of up to 20 meters. It uses 16-Pulse Position Modulation encoding for a data rate of 1 Mbps.

Figure 3A:
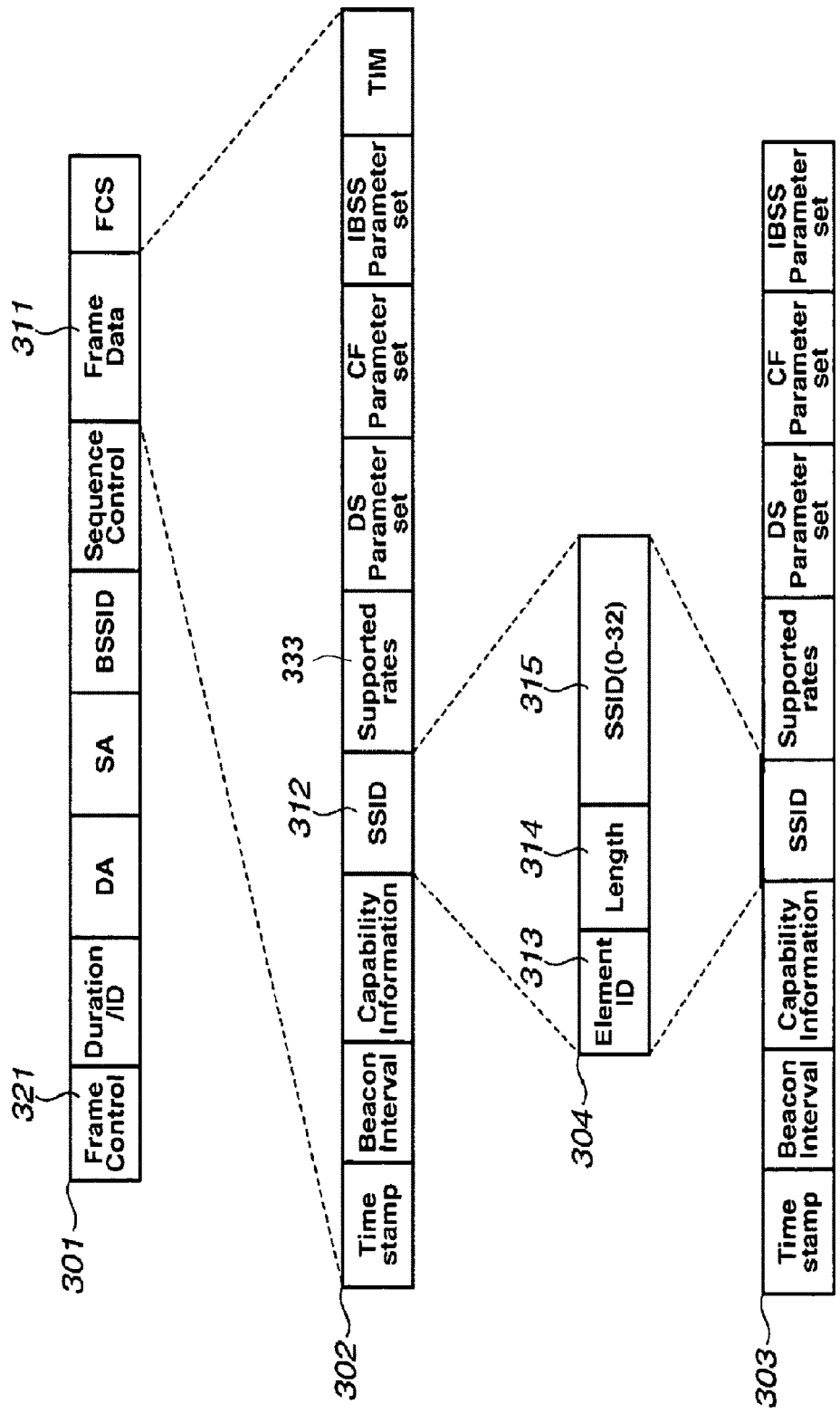
FIG. 3A is a diagram showing the media access control frame format of a management frame according to embodiments of the present disclosure.

In order to assess partner devices, such as to engage in P2P, for substantive communication using these physical mediums in the MAC layer, and according to 802.11, WiFi device discovery may engage in an exchange of discovery information between prospective communicating partner devices. This device discovery may preferably take the form of probe request and probe response frames, in order to "probe" for partner P2P devices. These frames are defined by the MAC layer protocol as management frames. FIG. 3A is a diagram illustrating the MAC frame format of a management frame, and, in particular, a probe request frame. In FIG. 3A, reference number 301 designates the MAC frame of a management frame. Reference number 302 denotes an information element stored in a field for frame data 311 in a case in which the subtype of a frame control field 321 is a probe request, for example. Further, the Service Set Identifier, or SSID (also referred to as the discovery ID) 312 is a field in which information on a group identifier (e.g. identifier of a group of associated WiFi devices) is set.

Reference number 304 denotes a detail data structure of an SSID information element. In the SSID information element 312, reference number 313 designates a field that stores an information element identifier (also referred to as the element ID). Reference number 314 denotes a field in which information on the length of the SSID data set in an SSID region is stored. Reference number 315 designates the SSID region, the maximum length of which is 32 bytes. Reference number 303 designates an information element stored in the field for the frame data 311 in a case wherein the subtype of the frame control field 321 is a probe request, for example. As shown, the probe request frame also contains information about the supported data rates 333 that the WiFi device supports.

A probe response frame is similar to the probe request frame. However, a subtype of the frame control field is set to a value indicating that the frame is a "probe response." Also, the probe response frame contains information concerning capabilities of a set (i.e., of the discovery ID) of currently associated WiFi devices (e.g., the data rates supported by the currently associated WiFi devices). Further, the probe response frame contains a field that provides PHY-specific information to a requesting WiFi device.

The IEEE 802.11 standard uses time synchronization to allow for the polling, spread spectrum, and discovery techniques discussed immediately above, and additionally to allow for other functionality, such as power savings through sleep mode, for example, during operation of these polling and spread spectrum techniques. For example, the access point 102 transmits periodic beacon frames to the devices 120x, 120y, 120z, to adjust the respective device clocks to the synchronized clock value of the frames from the access point.

Figure 3B:
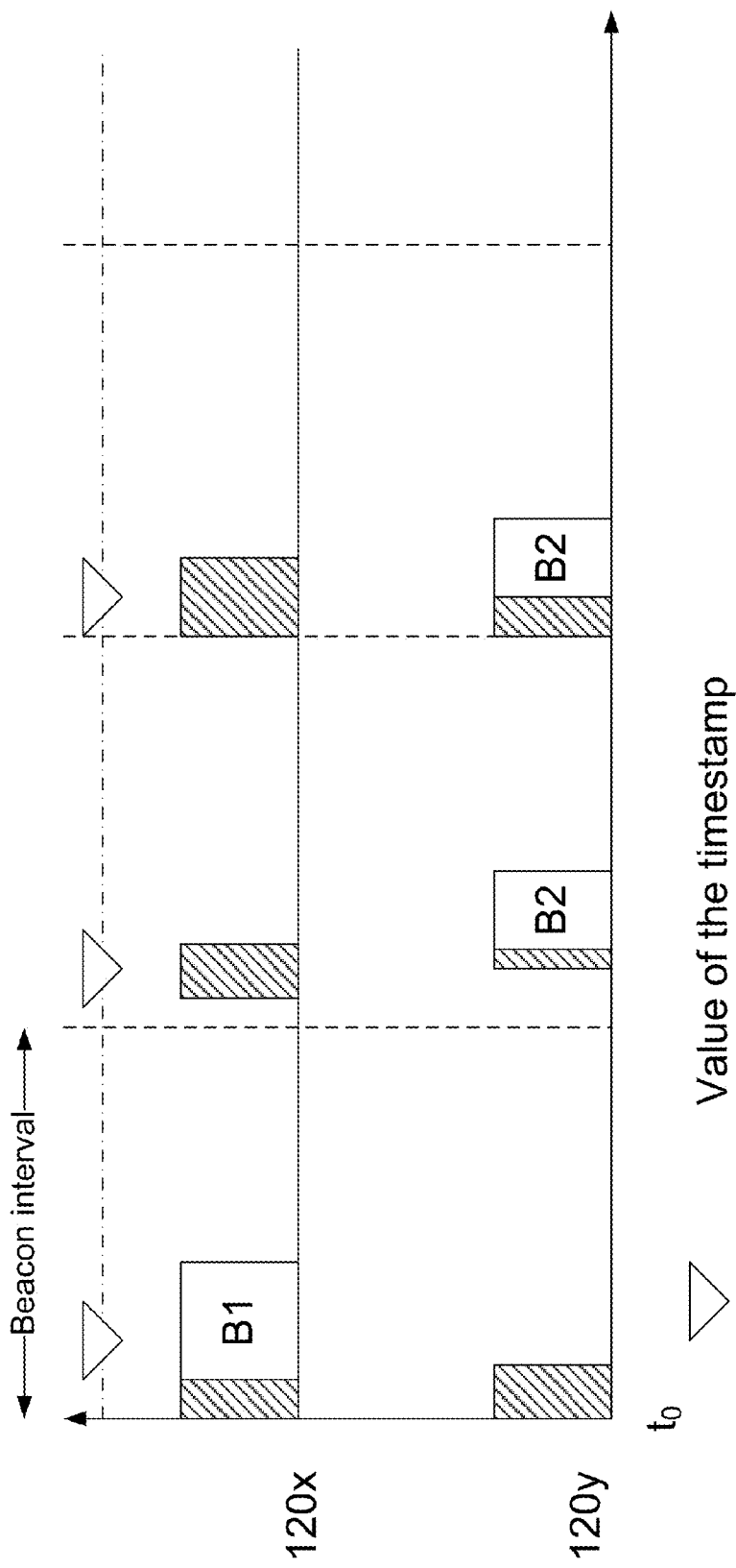
FIG. 3B illustrates time synchronization amongst the devices according to the IEEE 802.11 standard according to embodiments of the present disclosure.

In P2P mode, and as shown in FIG. 3B, time is divided into such beacon intervals. For simplicity, only two devices, 120x and 120y are shown. At the beginning of each interval, each device 120x and 120y synchronizes to the beacon frame. More particularly, if a beacon frame arrives before the device's random delay timer has expired, the device cancels the pending beacon frame transmission and a remaining random delay. It further sets its clock to the timestamp of the beacon if the beacon is not in accordance with the device's clock time.

As referenced above, enhanced WiFi devices receive this timing synchronization information in the form of beacons from the access point, although WiFi devices may further receive this beacon frame from the global positioning system (GPS), by way of non-limiting example. In accordance with this synchronized timing information, and in accordance with polling information indicating readiness or queuing of communications, current typical embodiments further include a synchronized periodic discovery intervals to discover proximate, prospective partner devices, such as to allow for P2P communications.

This periodic discovery interval may preferably occur in advance of substantive communications and polling, particularly in view of the fact that devices desiring P2P communication must first assess available partner devices that are proximate and able to engage in the desired P2P communications. The periodic discovery interval may be defined for each enhanced WiFi device 120x, 120y, 120z, such as by an adjacent access point 102 (hereinafter also "AP 102" and generally as "APs"). During the periodic discovery interval, the enhanced WiFi device wakes up to perform the discovery operation, to announce its presence, and to discover available partner devices for P2P communications.

However, because the duration of the periodic discovery interval is not optimized, disadvantages may arise in current typical embodiments depending on the length of the discovery interval. For example, if the discovery interval is too short, discovery does not scale properly with the density of enhanced WiFi devices. On the other hand, if the discovery interval is too long, the power efficiency of the enhanced WiFi device is poor.

Accordingly, embodiments of the disclosure are directed to increasing the efficiencies attendant to the discovery mode of WiFi devices (or nodes), particularly by enabling the increasing of power efficiency of these WiFi devices, enabling the co-existence of enhanced WiFi devices with legacy WiFi devices, and minimizing the PHY/MAC layer modifications needed to achieve the foregoing in WiFi protocol. Embodiments may adaptively adjust the periodic discovery interval as a function of the observed loading of discovery signals; may allow for the filtering of traffic from legacy WiFi devices; and may allow for the broadcast of discovery interval length information to synchronize nearby enhanced WiFi devices. Further, in embodiments, the respective transmission start times of each WiFi device may be randomized, such as for improved collision avoidance. As mentioned above, this improved collision avoidance may be enforced by CSMA/CA for example. As such, a device may begin transmission of data to another node. Based on the existence of any other nodes' transmissions, the node may interrupt its transmissions, and resume its transmission of the data after a subsequent occurrence of a periodic discovery interval.

Figure 4A:
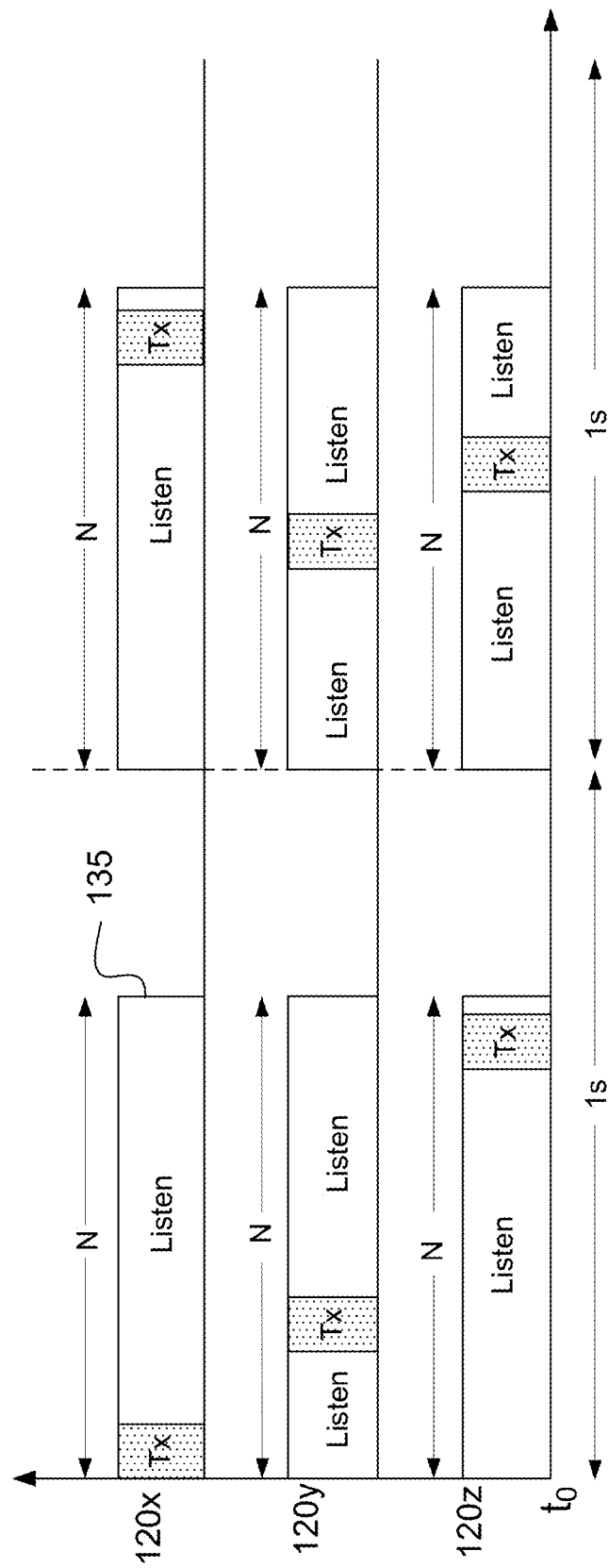

FIG. 4A is a timing diagram, illustrating a first occurrence of a periodic discovery interval 135 having a duration N and used by devices (i.e. nodes) 120x, 120y, and 120z at initial time period to. In typical embodiments, duration N is frequently defined to be 16 ms, although other initial durations may be assigned. The value of N is typically assigned upon synchronization of an enhanced WiFi device 120x, 120y, 120z to AP 102 upon entry to the WLAN of AP 102.

During duration N, devices seeking discovery transmit their respective device IDs in discovery messages in window Tx, and "listen" for the IDs of other devices seeking discovery and available to P2P communicate with a subject device 120x. The periodic discovery interval 135 repeats after every 1 second in current typical embodiments, and each device communicates its discovery messages in current typical embodiments in, for example, 10 µs. As such, in current typical embodiments and using a 16 ms discovery interval, up to 160 devices may transmit and receive discovery messages every second in a given periodic discovery interval 135.

However, in the example of FIG. 4A in which only 3 devices are committed to discovery, rather than closer to 160 devices, the use of 16 ms (which is not drawn to scale) for up to 160 devices every 1 second is highly inefficient. Thus, embodiments of the disclosure allow for variations in the duration N to better correspond the periodic discovery interval 135 to a number of devices engaged in discovery in a given periodic discovery interval 135.

In particular, duration N (typically in msec) may be adjusted by an enhanced WiFi device 120x that is receiving a new indicated value of a portion of duration N. This optimized portion of duration N may be indicated, explicitly or impliedly, in all discovery messages (as used herein, such discovery messages include probe requests/responses and/or service discovery requests/responses) received by the device 120x.

FIGS. 4B and 4C are additional timing illustrations of periodic discovery intervals 135 for each of devices 120x, 120y, and 120z, the periodic discovery intervals 135 beginning at time t1, and at time t2. In the illustrations, and also with respect to FIG. 4A, each of 120x, 120y, and 120z transmits its own ID and an indication of the number of devices it "heard" in a discovery message in the previous (or first) occurrence of the periodic discovery interval 135.

In the example of FIG. 4B, after time period t0, each of devices 120x, 120y, and 120z requires a window Tx for its discovery message transmissions at time period t1. That is, based on what each device "heard" at time period t0, it takes a particular length of time at time period t1 to transmit its own ID and its indication of the devices heard at time period t0.

Correspondingly, and as illustrated in FIG. 4C, in a subsequent occurrence of the periodic discovery interval 135 shown at time period t2, each of devices 120x, 120y, and 120z, upon "hearing" the others of 120x, 120y, and 120z, may adjust the duration N of its periodic discovery interval 135 based on the maximum number of devices it may respectively hear, and based on the maximum number of devices heard by the other devices it can respectively hear. As such, and as illustrated, at time period t2, each device 120x, 120y, and 120z adjusts its periodic discovery interval 135 (i.e., to account for its ID and how long it must listen to hear the devices it can hear). Said differently, a duration N' of the modified, subsequent occurrence of a periodic discovery interval 135 correlates to the maximum length transmit window Tx received in a previous occurrence of the periodic discovery interval 135.

As such, none of devices 120x, 120y, or 120z need listen for the full remainder of duration N after the periodic discovery interval 135. Further, respective receivers of devices 120x, 120y, and 120z may be disabled between occurrences of periodic discovery intervals. Thereby, the shaded portion of the duration N of the previous occurrence of the periodic discovery interval 135 is no longer used. Rather, the duration N' of the subsequent occurrence of the periodic discovery interval 135 may be minimized based on the maximum necessary listening time to hear all possible other WiFi devices, for all subsequent occurrences of periodic discovery intervals 135 after the first (or previous occurrences) of periodic discovery interval 135, based on what (e.g. a count of the number of discovery messages) each other device heard in each interval. Of course, other factors may be used to adjust the length of the portion of duration N consumed, such as by comparing the count of discovery messages to a threshold count of discovery messages to be heard (as may be indicated by the maximum duration of a listening window of all devices heard), a perceived system load, or the like. Relatedly, a particular threshold may be required prior to changing the consumed portion of duration N. Accordingly, the duration N may be, in an embodiment, the maximum count of discovery messages that may be heard, hereinafter "K," multiplied by a value in the range of 1-10 μs, by way of non-limiting example.

For example, a threshold number of discovery messages to be heard may be set, such as a default for devices in a particular cell upon synchronization, at K before an adjustment to the consumed portion of duration N occurs. In such an embodiment, if more than K discovery messages are received in the portion of N that constitutes the receiving portion of the periodic discovery interval, then the consumed portion of N may be increased to N'=N+Δ during the next discovery interval. In this example, N' may be an adjusted portion of N, or initial duration N if no adjustment has occurred. Further, in this example, Δ may be a predetermined time, or may be variable based on the maximum number of devices that may be heard. If less than K discovery messages are received in the receiving portion of length N, then N may be decreased to N'=N−Δ during the subsequent occurrence of the discovery interval. Of course, those skilled in the art will appreciate that it may be preferred, particularly for backwards compatibility, that the value of N' should not, at any time during the increment or decrement of N or N', exceed the initial length N. Further, for purposes of this discussion, those skilled in the art will appreciate that N may reference the "initial" duration for each new iteration of the foregoing, that is, the N', as used herein, represents an iterative adjustment to duration N by amount Δ.

Of note, Δ may be achieved incrementally or in the entirety upon each discovery window, Δ may be achieved using a binary or trinary element (i.e., may be either at a predefined high level or at a low level), and Δ may or may not be dependent upon the actual number of devices heard below or above K. For example, Δ may be incremented or decremented by an amount needed for each new discovery window, or may be incremented or decremented by no more than a predefined limit, such as 4 ms, for a given discovery interval. Likewise, the increment or decrement may be limited, such as in a binary or trinary embodiment, to 0, 1 ms, or 8 ms, by way of non-limiting example.

In exemplary embodiments, and as referenced above, new enhanced WiFi devices entering a WLAN may be assigned a duration N for a discovery window, such as N=12 ms. Alternatively, enhanced WiFi devices may be programmed or directed to assume a value of N when entering a new WLAN, such as N=16 ms. Further, alternatively, WiFi devices may listen to available discovery messages to determine a then-current value of N.

FIG. 5 is a signaling diagram illustrating signaling as between AP 102 and devices 120x, 120y, and 120z. At steps 502a, b, and c, AP 102 assigns an initial discovery interval length N to each of devices 120x, 120y, and 120z, respectively. At steps 504a, b, c, d, and e, each of devices 120x, 120y, and 120z transmits to other devices its ID during the discovery window of length N=16 ms. At steps 506a, b, and c, each of devices 120x, 120y, and 120z, respectively, listens for other device IDs for the remainder of interval of length N. For example, at steps 506a, b, and c, device 120x hears only device 120z, device 120y hears only device 120z, and device 120z hears devices 120x and 120y.

At steps 508a, b, and c, each of devices 120x, 120y, and 120z respectively, assesses other devices that it hears. At steps 510a, b, c, and d, each of devices transmits its ID, and its value of Tx for the other devices heard.

At steps 510a, b, c, and d, devices 120x, 120y, and 120z, respectively, receive the transmitted windows of other devices for the remainder of discovery interval having duration N.

At steps 512a, b, c, d, e and f, devices 120x, 120y, and 120z, respectively, transmit their respective IDs in a new discovery window. Thereafter, at steps 514a, b, and c, devices 120x, 120y, and 120z, respectively, listen for a different length interval based on the received windows of other devices.

Figure 6:
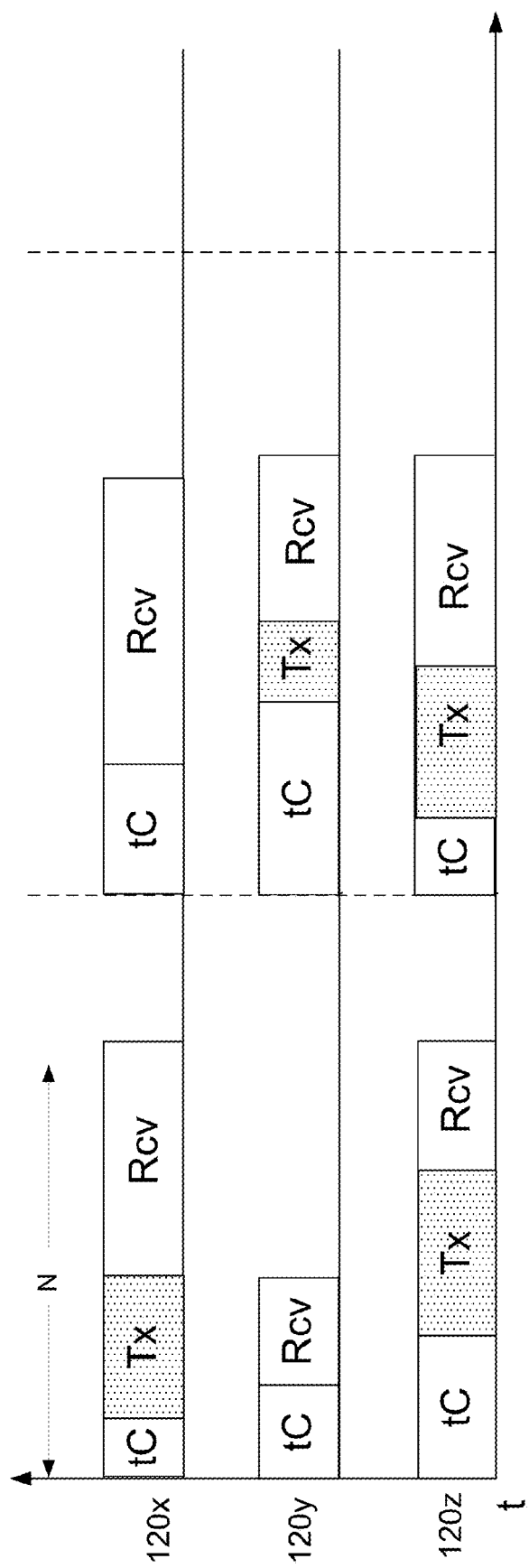
FIG. 6 is a timing diagram illustrating a collision avoidance mechanism of enhanced WiFi devices according to embodiments of the present disclosure.

As illustrated in FIG. 6, a starting time for each enhanced WiFi device to transmit in the discovery interval of duration N (and/or of length N or N'+/−Δ) may be randomized, such as to avoid collisions. For example, devices in a given cell 110a may be assigned a countdown time, tC and, upon counting down to 0 from tC, may transmit discovery data. Accordingly, and as shown in FIG. 6, as the discovery window length N is decreased to N', the number of slots used for the random starting position for each device's discovery transmission is compressed. Upon expiration of this compressed discovery window having randomized transmit times, enhanced WiFi devices are available to transmit and receive substantive data. Because legacy WiFi devices are subject to the standardized N for all discovery intervals, and must thus wait for substantive data traffic until the expiration of time N, the present disclosure provides both a smaller back off and collision avoidance for enhanced WiFi devices, thus allowing enhanced WiFi devices to communicate with priority over legacy devices through the use of the instant disclosure. Of course, those skilled in the art will appreciate that discovery transmit slots could alternatively be slotted using Aloha, or using the aforementioned CSMA, by way of non-limiting example.

Of additional note, those skilled in the art will appreciate that, during a discovery interval, enhanced WiFi devices may buffer lower priority on-going traffic data (e.g. best-effort and background traffic), such as in its queue, to allow for the start of the discovery procedure at the aforementioned randomized time or at another agreed-upon time. However, in such embodiments, voice traffic may be given the same or a greater access priority than discovery management frames (e.g., probe request/responses, service request/responses). Further, although video traffic may be given a lower priority than discovery management frames, video traffic may be highly sensitive to latency requirements.

Accordingly, lower priority on-going traffic data may be buffered to allow the discovery process to begin and may be buffered until the discovery process is completed. Buffering lower priority traffic data during discovery in accordance with the disclosure enables expedited and prioritized discovery of all available enhanced WiFi devices, so that enhanced WiFi devices that have no traffic, and/or that have no other devices available for communication, may quickly go to sleep to thereby converse power.

Moreover, as discussed above, the present disclosure offers backwards compatibility with existing discovery mechanisms. More particularly, the instant disclosure does not require devices to exceed currently typical values for N, nor are there required any changes or additions to overhead or synchronization, nor are any changes needed to present discovery messaging types or capabilities.

Figure 7:
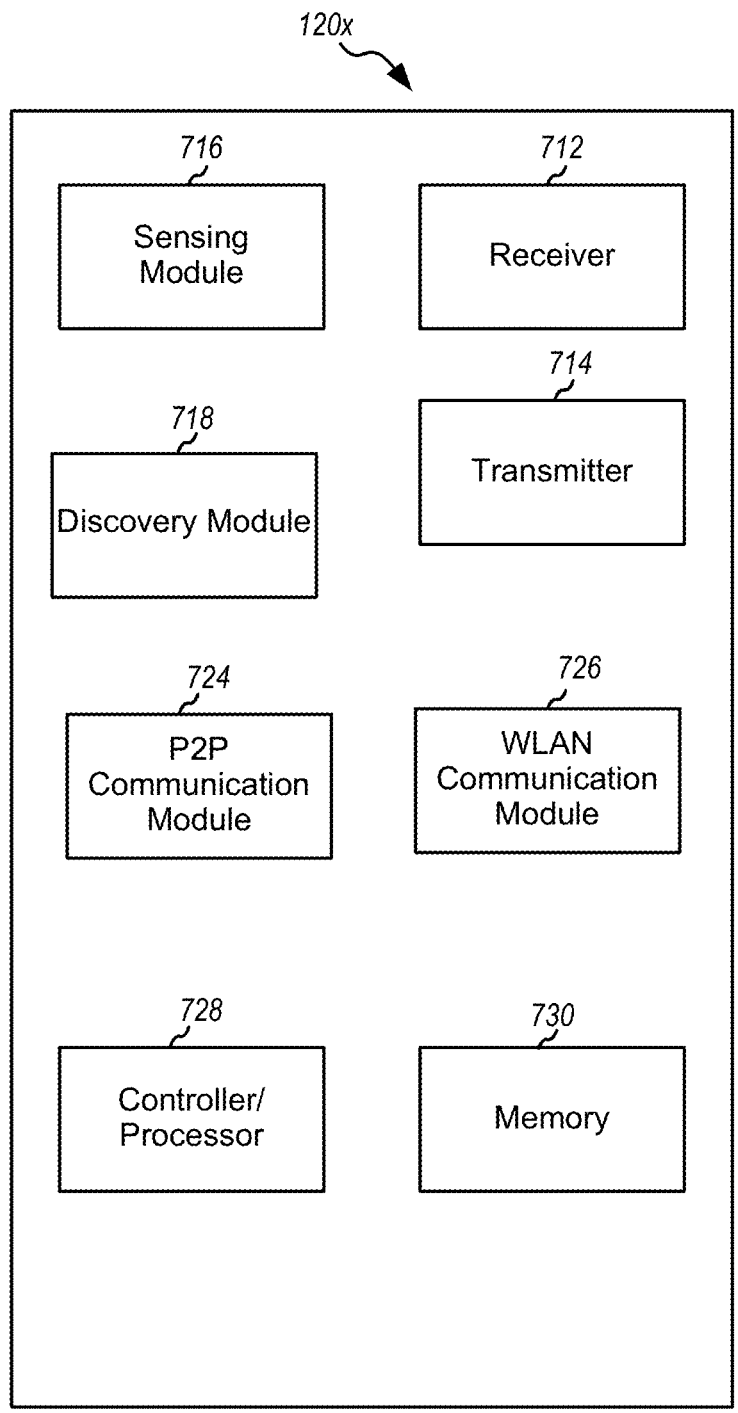
FIG. 7 shows a block diagram of an enhanced WiFi device capable of P2P communication and WLAN communication according to embodiments of the present disclosure.

FIG. 7 shows a block diagram of an enhanced WiFi device 120x capable of P2P communication and WLAN communication according to the disclosure. Within device 120x, a receiver 712 may receive signals transmitted by other devices for P2P communication, discovery signals, and downlink signals transmitted by APs for WLAN communication, by way of non-limiting example. A transmitter 714 may transmit P2P signals to other devices for P2P communication, peer discovery signals, and uplink signals to APs for WLAN communication, by way of non-limiting example.

A sensing module 716 may detect the presence of other devices during the periodic discovery interval, such as by using peer discovery signals received from APs or other devices 120y and 120z. Sensing module 716 may determine the duration of a discovery interval needed for transmission by other devices heard by device 120x. Sensing module 716 may also detect the presence of APs, and may measure channel gains, received power, and the like, for the detected devices and for APs.

A discovery module 718 may receive discovery interval information from an AP and/or from other devices. The discovery module 718 may, based on this discovery information, adjust a subsequent occurrence of the periodic discovery interval associated with the device, as discussed hereinthroughout, and such as based on information additionally received from sensing module 716. Discovery module 718 may further direct collision avoidance techniques, as discussed herein, based on discovery information received from the AP 102, sensing module 716, and/or from other devices.

A P2P communication module 724 may support P2P communication, for example, may generate and process signals used for P2P communication. A WLAN communication module 726 may support WLAN communication, for example, may generate and process signals used for WLAN communication. The various modules within device 120x may operate as described hereinthroughout. A controller/processor 728 may direct the operation of various modules within device 120x. A memory 730 may store data and program codes for device 120x.

Figures 8A, 8B:
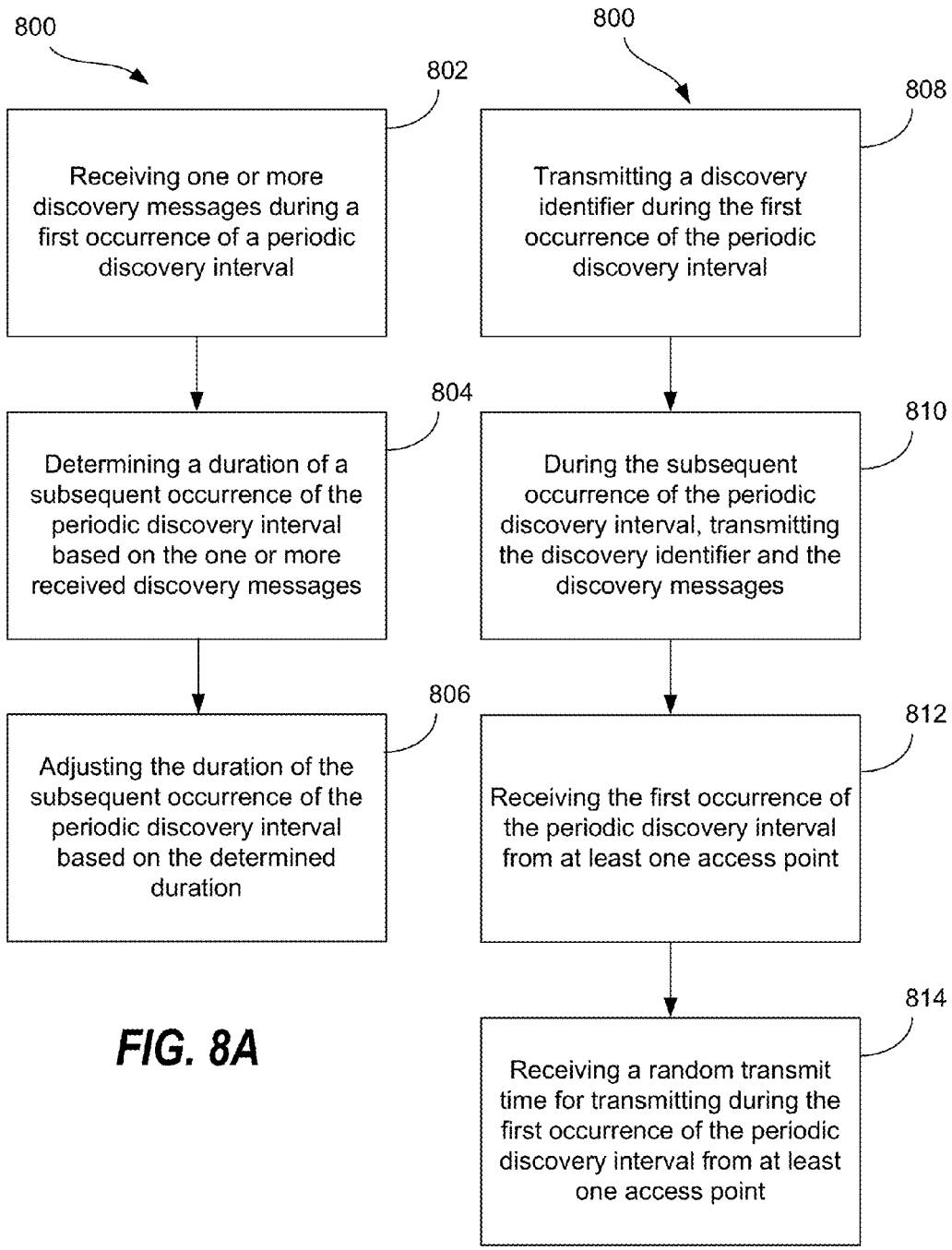
FIGS. 8A, 8B, and 9A-9D are flow diagrams illustrating methods of autonomous discovery of enhanced WiFi devices according to embodiments of the present disclosure.

FIG. 8A is a flow diagram illustrating a method 800 for discovery of at least one third enhanced WiFi device (or node). The method 800 may be, at least in part, directed to enabling autonomous discovery for P2P communication in a WLAN. At step 802, the first device (or node) may receive one or more discovery messages transmitted by at least one second device during a first occurrence of a periodic discovery interval. The one or more discovery messages may be indicative of the at least one third device. At step 804, the first device may determine a duration of a subsequent occurrence of the discovery interval based on the one or more received discovery messages. At step 806, the first device may adjust (in a binary manner, for example) the duration of the subsequent occurrence of a discovery interval responsive to the received discovery messages. The first device may adjust the duration of the subsequent occurrence of the discovery interval based on the determined duration. The duration may be adjusted by a decrement down to the total required reception time for the at least one second device to assess a presence of the at least one third device. The first device may adjust the duration by selecting one of a predetermined set of available adjustments.

With reference to FIG. 8B, there are shown further operations or aspects that may be optionally included in the method 800, and that may be performed by, for example, an enhanced WiFi device. That is, method 800 may occur and/or terminate after the steps illustrated in FIG. 8A without inclusion of any subsequent downstream block(s) that may be additionally illustrated in FIG. 8B. For example, during the first occurrence of the discovery interval, at step 808, the first device may transmit its discovery identifier. The first device may transmit this discovery identifier at a random start time within the first occurrence of the discovery interval. At step 810, during the subsequent occurrence of the discovery interval, the first device may transmit (at a random time, for example) its discovery identifier and the discovery messages. At step 812, the first device may receive the first occurrence of the discovery interval from at least one access point. At step 814, the first device may receive a random transmit time for transmitting during the first occurrence of the periodic discovery interval from at least one access point.

Figure 9A:
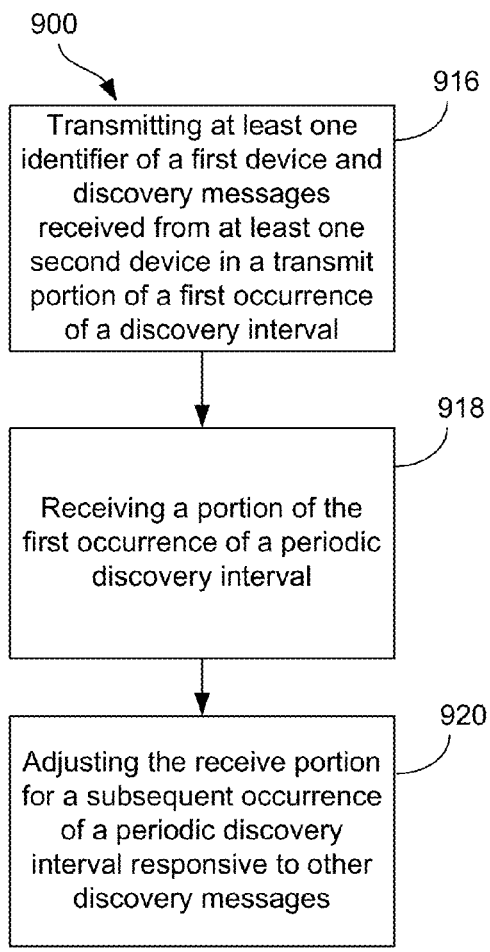

In another embodiment of the present disclosure, with reference to FIG. 9A, there is shown a methodology 900 discovering at least one third enhanced WiFi device in a communication system. It is noted that numbers associated with the blocks of FIG. 9A do not imply a particular order in which the corresponding steps are to be performed according to the method 900.

At step 916, a first device may transmit (at a random start time, for example) at least one identifier of the first device and discovery messages received from at least one second device in a transmit portion of a first occurrence of the discovery interval. At step 918, the first device may receive a portion of the first occurrence of a discovery interval and other discovery messages indicative of at least one third device. The other discovery messages may not be received in a previous occurrence of a periodic discovery interval by the first device and may be transmitted by the at least one second device. At step 920, the first device may adjust (by binary adjusting, for example) the receive portion for a subsequent occurrence of a periodic discovery interval responsive to the other discovery messages. A type of adjusting may be selected from a predetermined set of available adjustments.

Figure 9B:
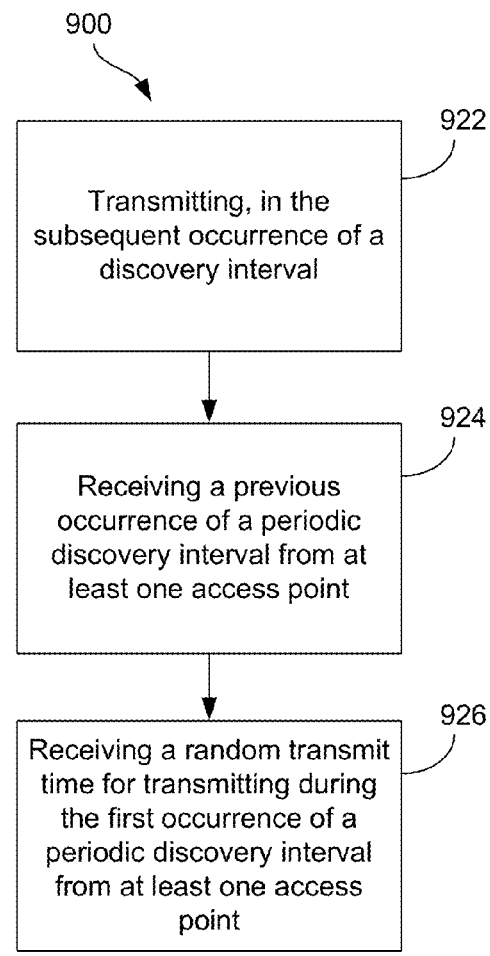

With reference to FIG. 9B, there are shown further operations or aspects that may be optionally included in the method 900, and that may be performed by, for example, an enhanced WiFi device. That is, method 900 may occur and/or terminate after the steps illustrated in FIG. 9A without inclusion of any subsequent downstream block(s) that may be additionally illustrated in FIG. 9B. For example, at step 922, in a subsequent occurrence of a discovery interval, the first device may transmit (at a random start time) within the subsequent occurrence of a discovery interval. At step 924, the first device may receive a previous occurrence of a discovery interval from at least one access point. At step 926, the first device may receive a random transmit time for transmitting during the first occurrence of a discovery interval from at least one access point. The first device may adjust the receive portion of the subsequent occurrence of a discovery interval to approach a reception time for the at least one second device to assess a presence of the at least one third device. This adjusting may comprise a decrement down to the total required reception time for the at least one second device to assess a presence of the at least one third device.

Figures 9C, 9D:
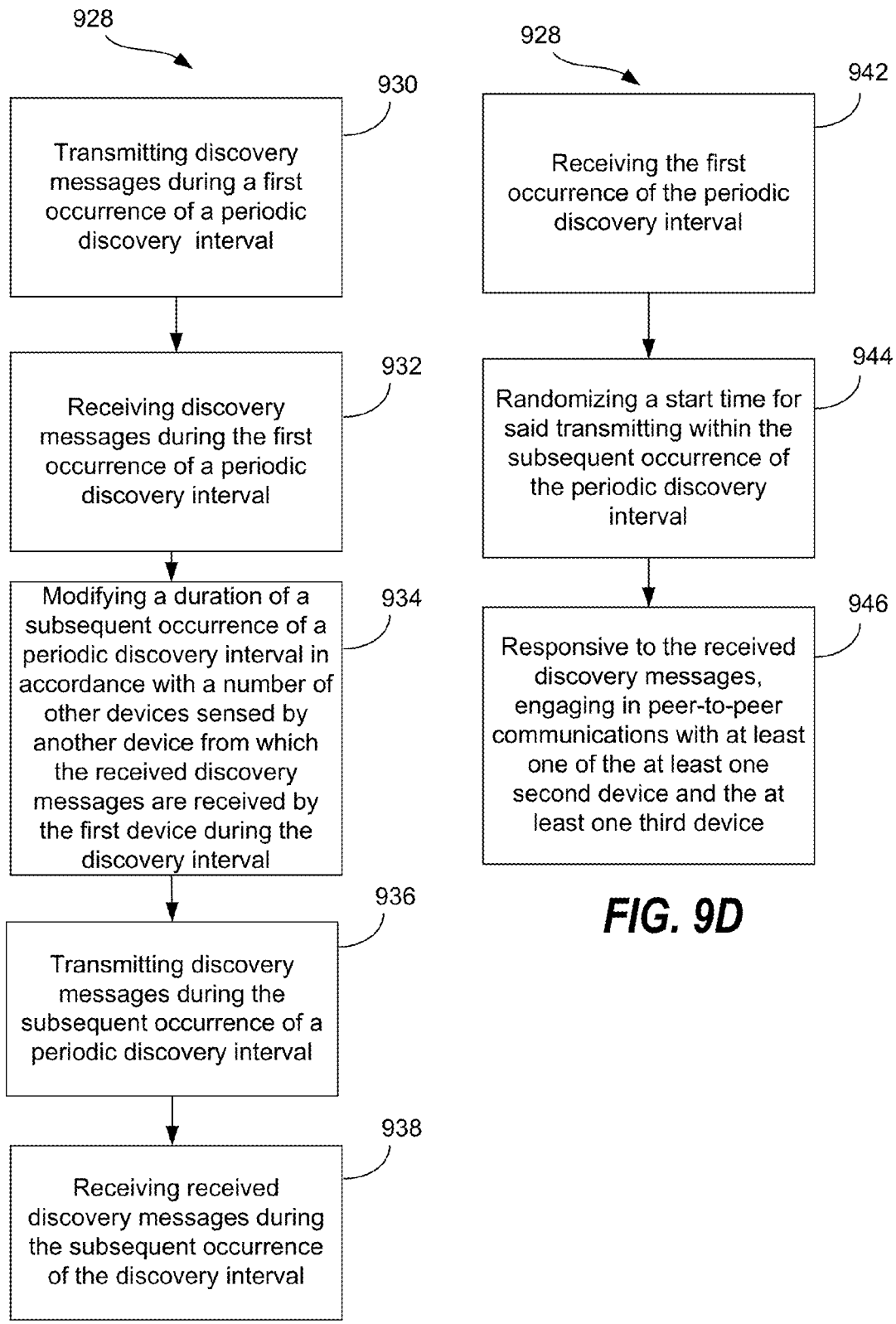

In another embodiment of the present disclosure, with reference to FIG. 9C, there is shown a methodology 928 for discovering at least one third device in a WiFi communication system. It is noted that numbers associated with the blocks of FIG. 9C do not imply a particular order in which the corresponding steps are to be performed according to the method 928. At step 930, a first device may transmit discovery messages during a first occurrence of a discovery interval. At step 932, the first device may receive discovery messages during the first occurrence of the discovery interval. At step 934, the first device may modify a duration of a subsequent occurrence of the discovery interval in accordance with a number of other devices sensed by another device from which the received discovery messages are received by the first device during the discovery interval. At step 936, the first device may transmit discovery messages during the subsequent occurrence of the discovery interval. At step 938, the first device may receive received discovery messages during the subsequent occurrence of the discovery interval.

With reference to FIG. 9D, there are shown further operations or aspects that may be optionally included in the method 928, and that may be performed by, for example, an enhanced WiFi device. That is, method 928 may occur and/or terminate after the steps illustrated in FIG. 9C without inclusion of any subsequent downstream block(s) that may be additionally illustrated in FIG. 9D. For example, at step 942, the first device may receive the first occurrence of the discovery interval. At step 944, the first device may randomize a start time for said transmitting within the subsequent occurrence of the discovery interval. Responsive to the received discovery messages, at step 946, the first device may engage in peer-to-peer communications with at least one of the at least one second device and the at least one third device.

Figure 10:
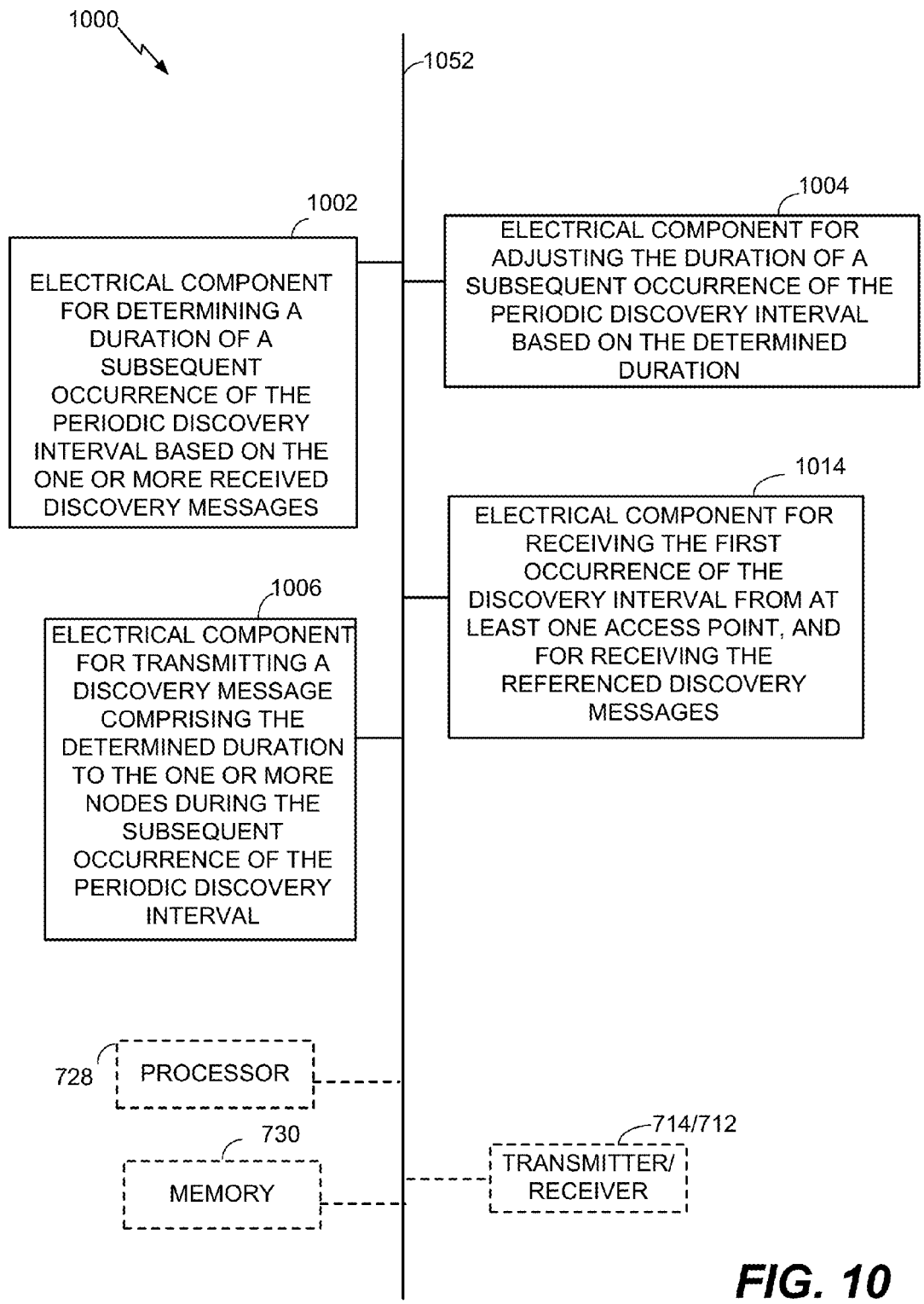
FIGS. 10-12 are block diagrams illustrating an exemplary apparatus that may be configured as a network entity according to embodiments of the present disclosure.

With reference to FIG. 10, there is provided an exemplary apparatus 1000 that may be configured as a network entity (e.g., device 120x) in a wireless network, or as a processor or similar device/component for use within the network entity. The apparatus 1000 may include functional blocks that can represent functions implemented by a processor (e.g., processor 728), software, or a combination thereof (e.g., firmware, such as memory 730). For example, apparatus 1000 may include an electrical component or module 1002 (e.g., sensing module 716 of device 120x) for determining a duration of a subsequent occurrence of the periodic discovery interval based on the one or more received discovery messages.

The apparatus 1000 may also include an electrical component or module 1004 (e.g., via discovery module 718 of device 120x) for adjusting the duration of a subsequent occurrence of the periodic discovery interval based on the determined duration. The apparatus 1000 may also include an electrical component or module 1006 (e.g., transmitter 714 of device 120x) for transmitting a discovery identifier of the wireless device during the first occurrence of a periodic discovery interval. Electrical component or module 1006 (which may be, for example, transmitter 714 of device 120x), or another component, may also be for transmitting at a random start time within the first periodic discovery interval. Electrical component or module 1006 (the transmitter 714 of device 120x, for example), or another component, may also be for beginning transmission of data to another node, interrupting transmission of the data during a subsequent occurrence of the periodic discovery interval, and resuming transmission of the data after the subsequent occurrence of the periodic discovery interval. Electrical component or module 1006 (the transmitter 714 of device 120x, for example), may also be for transmitting a discovery identifier of the wireless device and the discovery messages during the subsequent periodic discovery interval. The apparatus 1000 may also include the electrical component or module 1006 (the transmitter 714 of device 120x, for example), or another component, for transmitting at a random start time within the subsequent occurrence of the periodic discovery interval.

The apparatus 1000 may also include an electrical component or module 1014 (the receiver 712 of device 120x, for example) for receiving the first occurrence of the periodic discovery interval from at least one access point, and for receiving the referenced discovery messages. Electrical component or module 1014 (the receiver 712 of device 120x, for example), or another component, may also be for receiving a random transmit time for transmitting during the first occurrence of the periodic discovery interval from at least one access point.

Figure 11:
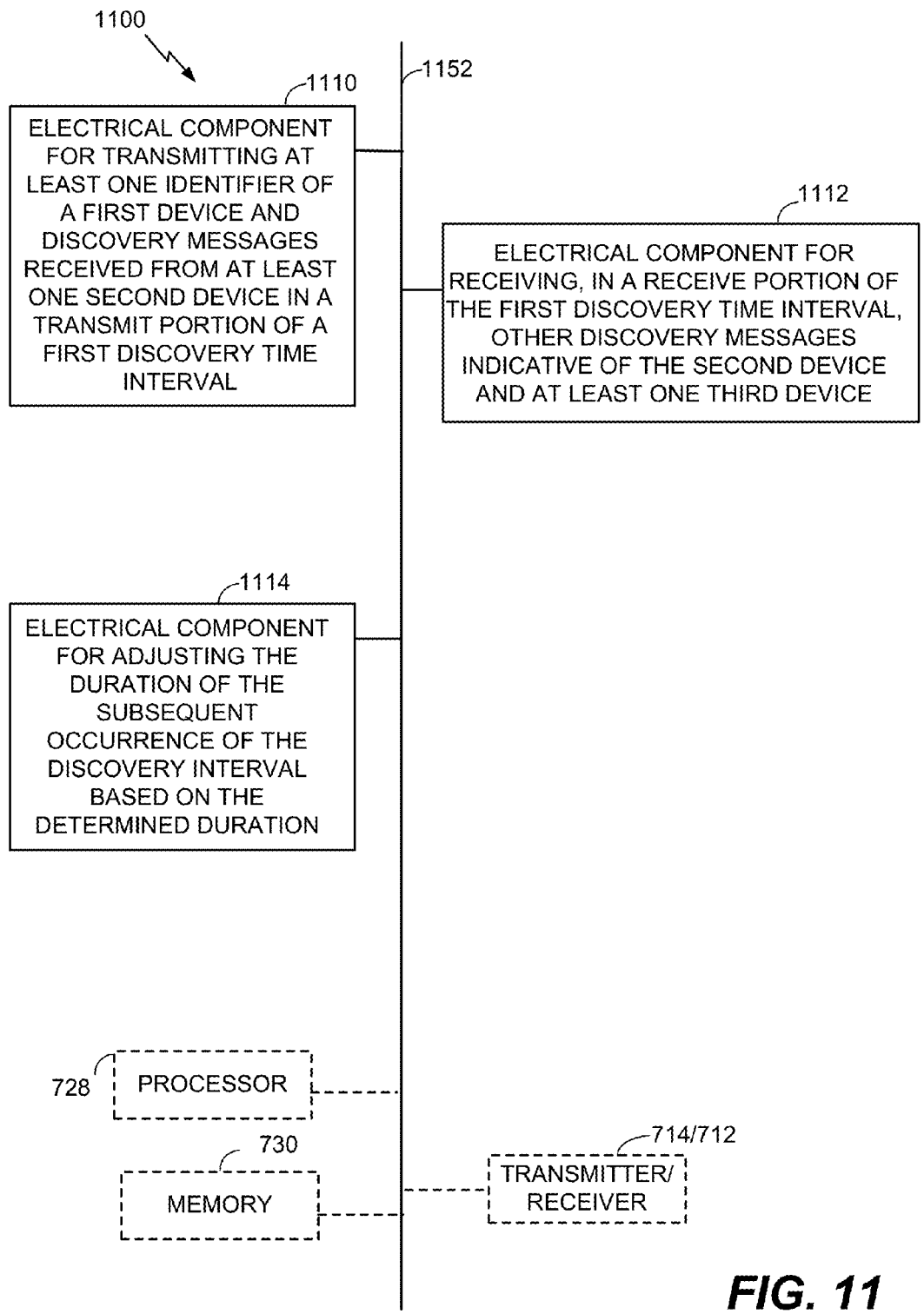

With reference to FIG. 11, there is provided an exemplary apparatus 1100 that may be configured as a network entity (e.g., a device 120x) in a wireless network, or as a processor or similar device/component for use within the network entity. The apparatus 1100 may include functional blocks that can represent functions implemented by a processor (e.g., processor 728), software, or a combination thereof (e.g., firmware, such as memory 730). For example, apparatus 1100 may include an electrical component or module 1110 (transmitter 714 of device 120x, for example) for transmitting at least one identifier of a first device and discovery messages received from at least one second device in a transmit portion of a first occurrence of a periodic discovery interval. The apparatus may also include an electrical component or module 1112 (receiver 712 of device 120x, for example) for receiving, in a receive portion of the first occurrence of a periodic discovery interval, other discovery messages indicative of the second device and at least one third device.

Electrical component or module 1114 (discovery module 718 of device 120x, for example) may provide for adjusting the receive portion for a subsequent occurrence of a periodic discovery interval responsive to the other discovery messages. The apparatus 1100 may also include an electrical component or module, such as component 1110 (the transmitter 714 of device 120x, for example) or another component, for transmitting in the subsequent time interval at a random start time within the subsequent occurrence of a periodic discovery interval. The apparatus 1100 may also include an electrical component or module, such as component 1112 (the receiver 712 of device 120x, for example) or another component, for receiving the previous occurrence of a periodic discovery interval from at least one access point. The apparatus 1100 may also include an electrical component or module, such as component 1112 (the receiver 712 of device 120x, for example) or another component, for receiving a random transmit time for transmitting during the first occurrence of a periodic discovery interval from at least one access point.

Figure 12:
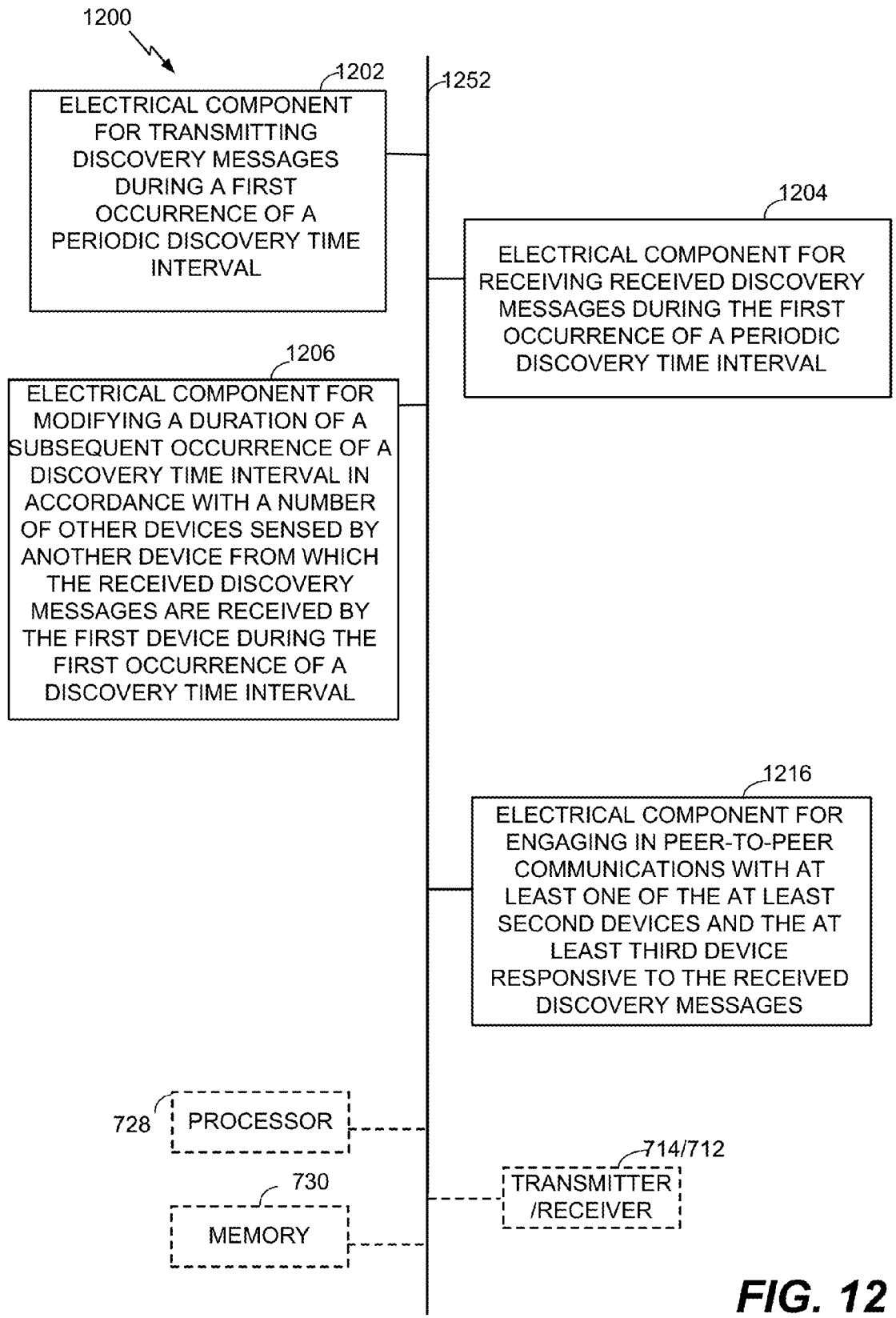

With reference to FIG. 12, there is provided an exemplary apparatus 1200 that may be configured as a network entity (e.g., device 120x) in a wireless network, or as a processor or similar device/component for use within the network entity. The apparatus 1200 may include functional blocks that can represent functions implemented by a processor (e.g., processor 728), software, or a combination thereof (e.g., firmware, such as memory 730). For example, apparatus 1200 may include an electrical component or module 1202 (e.g., transmitter 714 of device 120x) for transmitting discovery messages during a first occurrence of a period discovery interval. The apparatus 1200 may also include an electrical component or module 1204 (e.g., via receiver 712 of device 120x) for receiving received discovery messages during the first occurrence of a periodic discovery interval. The apparatus 1200 may also include an electrical component or module 1206 (e.g., discovery module 718 of device 120x) for modifying a duration of a subsequent occurrence of a periodic discovery interval in accordance with a number of other devices sensed by another device from which the received discovery messages are received by the first device during the first occurrence of the periodic discovery interval.

Electrical component or module 1202 (which may be, for example, transmitter 714 of device 120x), or another component, may also be for transmitting discovery messages during the subsequent occurrence of the periodic discovery interval. The apparatus 1200 may also include an electrical component or module, such as component 1204 (the receiver 712 of device 120x, for example) or another component, for receiving received discovery messages during the subsequent occurrence of the periodic discovery interval. The apparatus 1200 may also include an electrical component or module, such as component 1204 (the receiver 712 of device 120x, for example) or another component, for receiving the first occurrence of the periodic discovery interval.

The apparatus 1200 may also include an electrical component or module, such as component or module 1206 (the discovery module 718 of device 120x, for example) or another component, for randomizing a start time for transmitting during the subsequent occurrence of the periodic discovery interval. The apparatus 1200 may also include an electrical component or module 1216 (the P2P communication module 724 of device 120x, for example) for engaging in peer-to-peer communications with at least one of the at least second device and the at least one third device responsive to the received discovery messages.

In related aspects, apparatus 1000, 1100, and 1200 may optionally include processor component 728, which may be in operative communication with the components 1002-1014, 1110-1120, and 1202-1216 respectively, via buses 1052, 1152, 1252 respectively, or via similar communication coupling. The processor 728 may effect initiation and scheduling of the processes or functions performed by electrical components 1002-1014, 1110-1114, and 1202-1216.

In other related aspects, the apparatus described herein may include radio transmitter/receiver components 714/712. When the apparatus 1000, 1100, or 1200 is a device or similar network entity, that apparatus may also include a network interface (not shown) for connecting to one or more core network entities. Each of these apparatus 1000, 1100, and 1200 may optionally include a component for storing information, such as, for example, a memory device/component 730. The computer readable medium or the memory component 730 may be operatively coupled to the other components of the apparatus 1000, 1100, 1200 such as via the bus 1052, 1152, 1252, or the like. The memory component 730 may be adapted to store computer readable instructions and data for affecting the processes and behavior of the components described in each of the apparatus, and subcomponents thereof, or the processors, or the methods disclosed herein. The memory component described herein may retain instructions for executing functions associated with the components each of the components of each of the apparatus. While shown as being external to the memory components, it is to be understood that each of the components can exist within the respective memory components. It is further noted that the components in FIGS. 10-12 may comprise processors, electronic devices, hardware devices, electronic sub-components, logical circuits, memories, software codes, firmware codes, and the like, or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium, and preferably on a non-transitory computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A discovery method for wireless communication comprising:
operating, by a processor, a first node to receive one or more discovery messages from one or more other nodes during a first occurrence of a periodic discovery interval;
   operating, by a processor, the first node to determine a duration of a subsequent occurrence of the periodic discovery interval based on the one or more received discovery messages, said discovery interval including a first time during which said first node listens for discovery messages and a second time during which said first node transmits a discovery message, said determined duration being a time less than or equal to N, wherein N is an initial discovery interval length assigned by an access point; and
   operating, by a processor, the first node to adjust the duration of the subsequent occurrence of the periodic discovery interval based on the determined duration and to reduce a range of count down times used to determine a random starting position of a discovery transmission when the adjusted duration of the subsequent occurrence of the periodic discovery interval is less than N.

2. The method of claim 1, wherein the determining of the duration is based on a count of the one or more received discovery messages; and wherein the determining of the duration comprises comparing the count to a threshold.

3. The method of claim 1, further comprising: proceeding with a transmission of data upon the expiration of a periodic discovery interval having a duration less than N without waiting for the expiration of the time period N.

4. The method of claim 1, further comprising operating the first node to transmit a discovery message comprising the determined duration to other nodes during the subsequent occurrence of the periodic discovery interval at a randomly determined time within the subsequent occurrence of the periodic discovery interval.

5. The method of claim 1, wherein the first node receives each of the discovery messages from different nodes relative to one another and each of the discovery messages comprises a count of a number of discovery messages received during an occurrence of the periodic discovery interval by the node from which the discovery message was received.

6. The method of claim 5, wherein the determining of the duration is based on the counts of the discovery messages.

7. The method of claim 6, wherein the determining of the duration is based on the largest of the counts of the discovery messages.

8. The method of claim 6, wherein the determining of the duration comprises comparing the counts of the discovery messages to a threshold.

9. The method of claim 1, wherein the adjusting of the duration comprises reducing the duration of the subsequent occurrence of the periodic discovery interval relative to the first occurrence of the periodic discovery interval.

10. The method of claim 1, wherein the first node which supports adjusting the duration of the subsequent occurrence of the periodic discovery interval is given communication priority over nodes which do not support adjusting the duration of the subsequent occurrence of the periodic discovery interval.

11. The method of claim 1, further comprising disabling a receiver of the first node between the occurrences of the periodic discovery interval.

12. The method of claim 1, further comprising:
   prior to the subsequent occurrence of the periodic discovery interval, operating the first node to begin transmission of data to another node,
   operating the first node to interrupt the transmission of the data during the subsequent occurrence of the periodic discovery interval, and
   operating the first node to resume the transmission of the data after the subsequent occurrence of the periodic discovery interval.

13. A first node configured to discover one or more other nodes in a wireless communication system, comprising:
   a receiver configured to receive one or more discovery messages from one or more other nodes during a first occurrence of a periodic discovery interval;
   a sensing module configured to determine a duration of a subsequent occurrence of the periodic discovery interval based on the one or more received discovery messages, said discovery interval including a first time during which said first node listens for discovery messages and a second time during which said first node transmits a discovery message, said determined duration being a time less than or equal to N, wherein N is an initial discovery interval length assigned by an access point; and
   a discovery module configured to adjust the duration of the subsequent occurrence of the periodic discovery interval based on the determined duration and to reduce a range of count down times used to determine a random starting position of a discovery transmission when the adjusted duration of the subsequent occurrence of the periodic discovery interval is less than N.

14. The first node of claim 13, wherein the sensing module is further configured to determine the duration based on a count of the one or more received discovery messages and by comparing the count to a threshold.

15. The first node of claim 13, further comprising a transmitter configured to transmit a discovery message comprising the determined duration to one or more other nodes during the subsequent occurrence of the periodic discovery interval.

16. The first node of claim 15, wherein the transmitter is further configured to transmit the discovery message at a randomly determined time within the subsequent occurrence of the periodic discovery interval.

17. The first node of claim 13, wherein the receiver is further configured to receive each of the discovery messages from different nodes relative to one another and each of the discovery messages comprises a count of a number of discovery messages received during an occurrence of the periodic discovery interval by the node from which the discovery message was received.

18. The first node of claim 17, wherein the sensing module is further configured to determine the duration based on the counts of the discovery messages.

19. The first node of claim 18, wherein the sensing module is further configured to determine the duration based on the largest of the counts of the discovery messages.

20. The first node of claim 18, wherein the sensing module is further configured to determine the duration by comparing the counts of the discovery messages to a threshold.

21. The first node of claim 13, wherein the discovery module is further configured to adjust the duration by reducing the duration of the subsequent occurrence of the periodic discovery interval relative to the first occurrence of the periodic discovery interval.

22. The first node of claim 13, wherein the first node which supports adjusting the duration of the subsequent occurrence of the periodic discovery interval is given communication priority over nodes which do not support adjusting the duration of the subsequent occurrence of the periodic discovery interval.

23. The first node of claim 13, wherein the receiver is further configured to power down between the occurrences of the periodic discovery interval.

24. The first node of claim 13,
wherein said discovery module is further configured to interrupt the transmission of the data during the subsequent occurrence of the periodic discovery interval; and
wherein the first node further comprises a transmitter configured to:
begin transmission, prior to the subsequent occurrence of the periodic discovery interval, of data to another node; and
resume the transmission after the interruption of the transmission of the data during the subsequent occurrence of the periodic discovery interval.

25. A computer program product, comprising:
a non-transitory computer-readable medium associated with a first node configured to discover one or more other nodes in a communication system, comprising:
code for receiving one or more discovery messages from one or more other nodes during a first occurrence of a periodic discovery interval;
code for determining a duration of a subsequent occurrence of the periodic discover discovery interval based on the one or more received discovery messages, said discovery interval including a first time during which said first node listens for discovery messages and a second time during which said first node transmits a discovery message, said determined duration being a time less than or equal to N, wherein N is an initial discovery interval length assigned by an access point; and
code for adjusting the duration of the subsequent occurrence of the periodic discovery interval based on the determined duration and reducing a range of count down times used to determine a random starting position of a discovery transmission when the adjusted duration of the subsequent occurrence of the periodic discovery interval is less than N.

26. The computer program product of claim 25, wherein the code for determining the duration comprises code for determining the duration based on a count of the one or more received discovery messages and based on comparing the count to a threshold.

27. The computer program product of claim 25, further comprising code for transmitting a discovery message comprising the determined duration to other nodes during the subsequent occurrence of the periodic discovery interval.

28. The computer program product of claim 27, wherein the code for transmitting the discovery message comprises code for transmitting the discovery message at a randomly determined time within the subsequent occurrence of the periodic discovery interval.

29. The computer program product of claim 25, wherein the first node receives each of the discovery messages from the one or more other nodes relative to one another and each of the discovery messages comprises a count of a number of discovery messages received during an occurrence of the periodic discovery interval by the node from which the discovery message was received.

30. The computer program product of claim 29, wherein the code for determining the duration is based on the counts of the discovery messages.

31. The computer program product of claim 30, wherein the determining the duration is based on the largest of the counts of the discovery messages.

32. The computer program product of claim 30, wherein the determining the duration comprises comparing the counts of the discovery messages to a threshold.

33. The computer program product of claim 25, wherein the adjusting the duration comprises reducing the duration of the subsequent occurrence of the periodic discovery interval relative to the first occurrence of the periodic discovery interval.

34. The computer program product of claim 25, wherein the first node which supports adjusting the duration of the subsequent occurrence of the periodic discovery interval is given communication priority over nodes which do not support adjusting the duration of the subsequent occurrence of the periodic discovery interval.

35. The computer program product of claim 25, further comprising code for disabling a receiver of the first node between the occurrences of the periodic discovery interval.

36. The computer program product of claim 25, further comprising:
code for beginning transmission of data to another node, prior to the subsequent occurrence of the periodic discovery interval,
code for interrupting the transmission of the data during the subsequent occurrence of the periodic discovery interval, and
code for resuming the transmission.

* * * * *